US007652730B2

(12) United States Patent  (10) Patent No.: US 7,652,730 B2
Hayashimoto  (45) Date of Patent: Jan. 26, 2010

(54) LIQUID CRYSTAL DISPLAY DEVICE

(75) Inventor: Seiji Hayashimoto, Tokyo (JP)

(73) Assignee: Sony Corporation (JP)

( * ) Notice: Subject to any disclaimer, the term of this patent is extended or adjusted under 35 U.S.C. 154(b) by 72 days.

(21) Appl. No.: 11/985,556

(22) Filed: Nov. 15, 2007

(65) Prior Publication Data

US 2008/0143922 A1    Jun. 19, 2008

(30) Foreign Application Priority Data

Nov. 20, 2006   (JP)  ............ P2006-312582

(51) Int. Cl.
 *G02F 1/1333*  (2006.01)
(52) U.S. Cl. .................... 349/60; 349/58
(58) Field of Classification Search .......... 349/58, 349/60–61, 70
  See application file for complete search history.

(56) References Cited

FOREIGN PATENT DOCUMENTS

| JP | 4-11583 U | | 1/1992 |
|---|---|---|---|
| JP | 11-242447 | * | 9/1999 |
| JP | 11-242447 A | | 9/1999 |
| JP | 2001-013886 | * | 1/2001 |
| JP | 2001-013886 A | | 1/2001 |
| JP | 2004-296193 A | | 10/2004 |
| JP | 2005-077557 A | | 3/2005 |
| JP | 2006-235127 A | | 9/2006 |

OTHER PUBLICATIONS

Japanese Office Action issued on Oct. 1, 2008 in connection with corresponding Japanese Appln. No. 2006-312582.

* cited by examiner

*Primary Examiner*—Frank G Font
*Assistant Examiner*—Michael P Mooney
(74) *Attorney, Agent, or Firm*—Lerner, David, Littenberg, Krumholz & Mentlik, LLP

(57) ABSTRACT

A liquid crystal display device is disclosed. The device may include a case; and a square-shaped flat liquid crystal panel incorporated inside of the case. In the device, the case may include a square-frame-shaped rear wall abutting a rim portion of a rear surface located on a side opposite to a display surface of the liquid crystal panel, and a square-frame-shaped front wall abutting a rim portion of the display surface of the liquid crystal panel, and sandwiching the liquid crystal panel with the rear wall, a pair of positioning pieces may be provided to either the rear wall or the front wall for positioning of the liquid crystal panel with respect to the case by respectively coming in contact with side portions of the liquid crystal panel that are opposing each other, and the positioning pieces may each be formed to be elastically deformable along a plane direction of the liquid crystal panel.

9 Claims, 9 Drawing Sheets

LIQUID CRYSTAL DISPLAY DEVICE

CROSS REFERENCES TO RELATED APPLICATIONS

This application claims priority from Japanese Patent Application No. JP 2006-312582 filed in the Japanese Patent Office on Nov. 20, 2006, the entire content of which is incorporated herein by reference.

BACKGROUND OF THE INVENTION

1. Field of the Invention

The present invention relates to a liquid crystal display device.

2. Description of Related Art

Currently available liquid crystal display devices are those for television units and display units of personal computers, for example.

Such liquid crystal display devices are each configured by a square-shaped flat liquid crystal panel being incorporated inside of a case.

With such a liquid crystal display device, typically, the liquid crystal panel is positioned along a plane direction of the display surface by four sides thereof coming in contact with the side walls of a case that extend along the four sides of the liquid crystal panel. With positioning done as such, the liquid crystal panel is supported by the case or a member attached thereto pinching the rim portion of the display surface of the panel and the rim portion of the rear surface located opposite to the display surface. For more details, refer to Patent Document 1 (JP-A-2004-296193).

SUMMARY OF THE INVENTION

In most cases, a case is made of synthetic resin, and a liquid crystal panel is configured including two glass substrates and a liquid crystal layer sandwiched therebetween.

The concern with the case made of synthetic resin as such is the thermal coefficient of expansion of synthetic resin being larger about by an order of magnitude than that of glass. It means that if the environmental temperature is decreased, the case shrinks more compared with the liquid crystal panel.

With shrinkage as such, the four sides of the liquid crystal panel are pressed strongly by the side walls of the case, and the liquid crystal panel thus suffers from the force in the direction along the display surface thereof. This resultantly causes a problem of disturbing the display screen of the liquid crystal panel, and this problem occurs more frequently for liquid crystal display devices larger in size with size-increased liquid crystal panel and case.

It may thus be desirable to provide a liquid crystal display device that is capable of, irrespective of any possible change of the environmental temperature, performing positioning of a liquid crystal panel along the display surface thereof while display images are of satisfactory quality, and is advantageous in terms of size increase.

According to an embodiment of the present invention, there is provided a liquid crystal display device which may include a case; and a square-shaped flat liquid crystal panel incorporated inside of the case. In the device, the case may include a square-frame-shaped rear wall abutting a rim portion of a rear surface located on a side opposite to a display surface of the liquid crystal panel; and a square-frame-shaped front wall abutting a rim portion of the display surface of the liquid crystal panel, and sandwiching the liquid crystal panel with the rear wall. A pair of positioning pieces may be provided to either the rear wall or the front wall for positioning of the liquid crystal panel with respect to the case by respectively abutting side portions of the liquid crystal panel that are opposing each other, and the positioning pieces may each be formed to be elastically deformable along a plane direction of the liquid crystal panel.

According to the embodiment of the invention, the liquid crystal panel may be positioned with respect to the case by the positioning pieces formed to be elastically deformable along the plane direction of the liquid crystal panel coming in contact with the side portions of the liquid crystal panel that are opposing each other. As such, the liquid crystal panel may be positioned without fail in the direction along the display surface thereof.

What is more, even if the case shrinks more compared with the liquid crystal panel as a result of the decrease of the environmental temperature, with the positioning pieces elastically deformed as such, the force acting on the side portions of the liquid crystal panel may be reduced, thereby being able to prevent without fail any problem of disturbing the display screen of the liquid crystal panel.

DETAILED DESCRIPTION

An embodiment of the invention is described by referring to the accompanying drawings.

Described first is a television unit 10 using a liquid crystal display device 30 of the embodiment.

Figure 1:
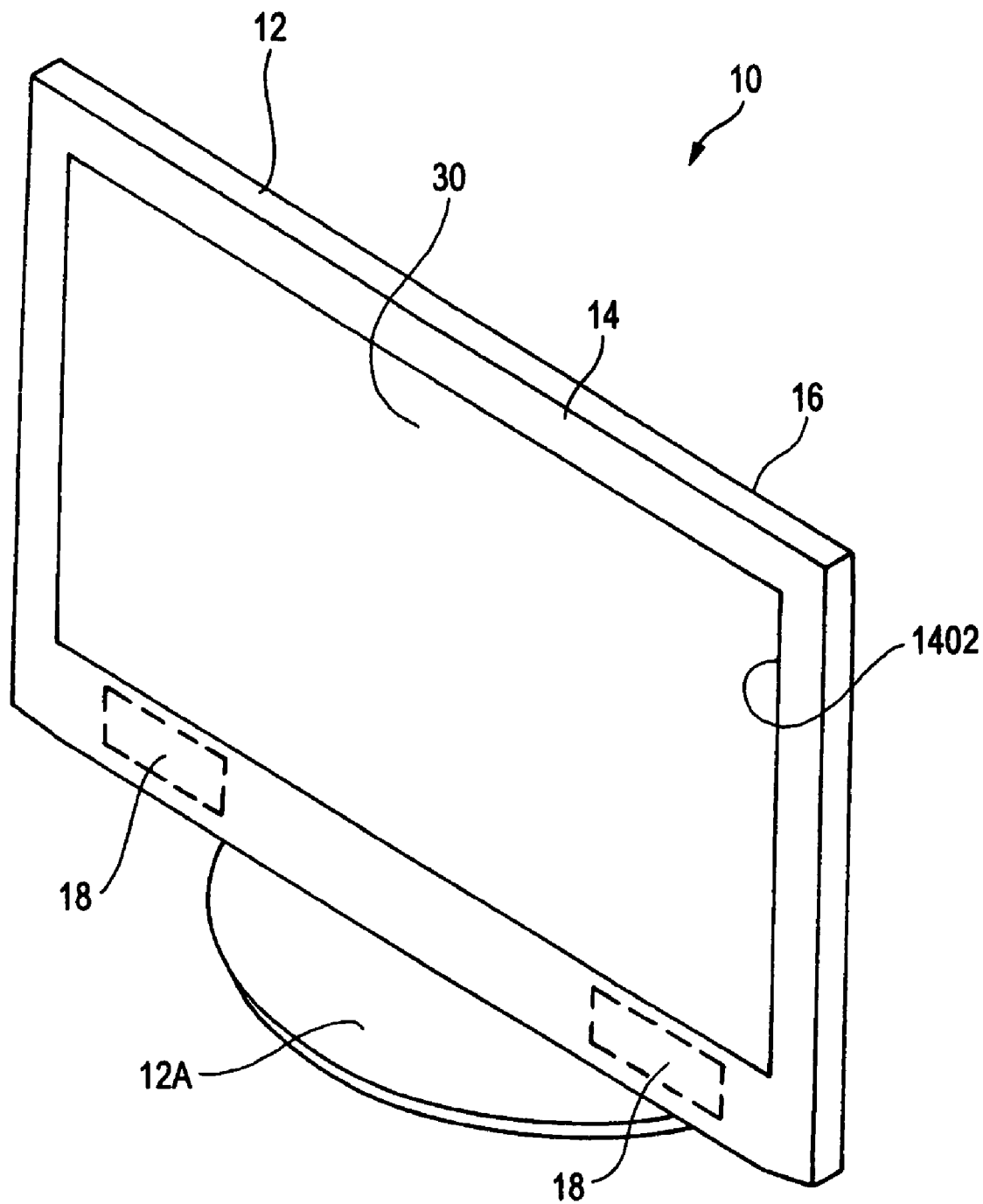
FIG. 1 is a perspective view of a television unit 10.

FIG. 1 is a perspective view of the television unit 10.

As shown in FIG. 1, the television unit 10 is configured to include a chassis 12 configuring an outer sheath, and a base 12A. The base 12A is provided beneath the chassis 12 on the placement plane thereof. Inside of the chassis 12, a liquid crystal display device 30 of the embodiment of the invention is incorporated, and the chassis 12 is provided with an electrical section 20 (refer to FIG. 2).

Figure 2:
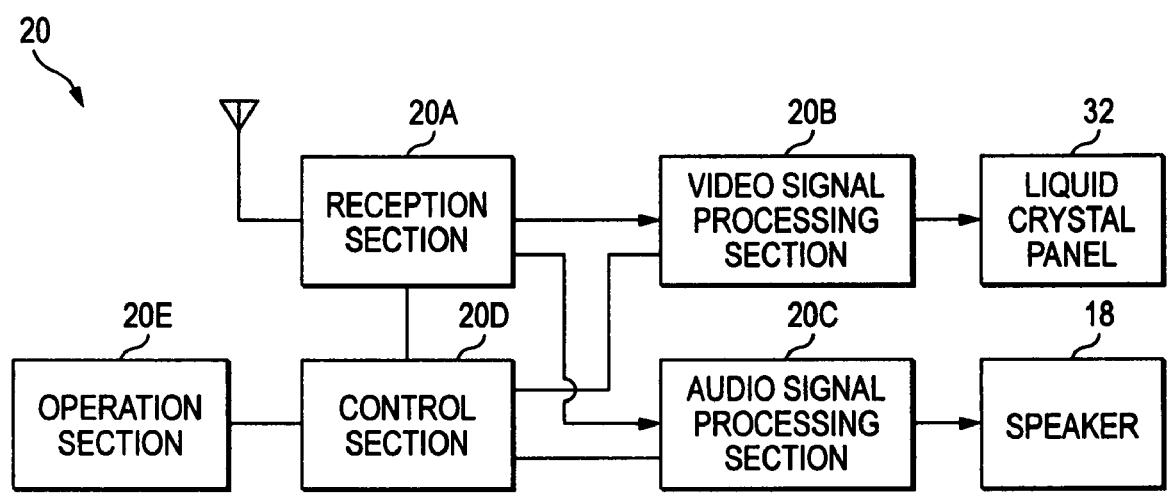
FIG. 2 is a block diagram showing the configuration of an electrical section 20 of the television unit 10.

FIG. 2 is a block diagram showing the configuration of the electrical section 20 of the television unit 10.

The electrical section 20 is configured to include a reception section 20A, a video signal processing section 20B, an audio signal processing section 20C, a control section 20D, an operation section 20E, and others.

The reception section 20A performs channel selection in accordance with a command coming from the control section 20D. The reception section 20A also demodulates an incoming television signal provided by an antenna, and separates, for output, the signal into a video signal and an audio signal.

The video signal processing section 20B applies any needed signal processing to the video signal, and supplies the result to a liquid crystal panel 32 of the liquid crystal display device 30 (refer to FIG. 1). As such, image display is made on the liquid crystal panel 32.

The audio signal processing section 20C applies any needed signal processing and amplification processing to the audio signal. The resulting generated audio signal is supplied to a speaker 18. Through supply of the audio signal as such, audio is generated from the speaker 18.

The operation section 20E is provided for various types of operations and settings related to broadcast viewing by the television device 10, and includes a station selection switch, a volume adjustment switch, an input switching switch, and others.

The control section 20D controls the components, i.e., the reception section 20A, the video signal processing section 2B, and the audio signal processing section 20C, depending on how the operation section 20E is operated.

Although not shown, the control section 20D is also provided with an external input terminal and an input switching circuit. The external input terminal is used to input video and audio signals coming from any external device such as DVD player and video cassette recorder. The input switching circuit receives the video and audio signals provided to such an external input terminal after switching those to the video signal processing section 20B and the audio signal processing section 20C, respectively.

Through operation of the operation section 20E, the video and audio signals provided to the external input terminal are directed, respectively, to the video signal processing section 20B and the audio signal processing section 20C via the input switching circuit.

Described next is the liquid crystal display device 30 of the embodiment.

Figure 3:
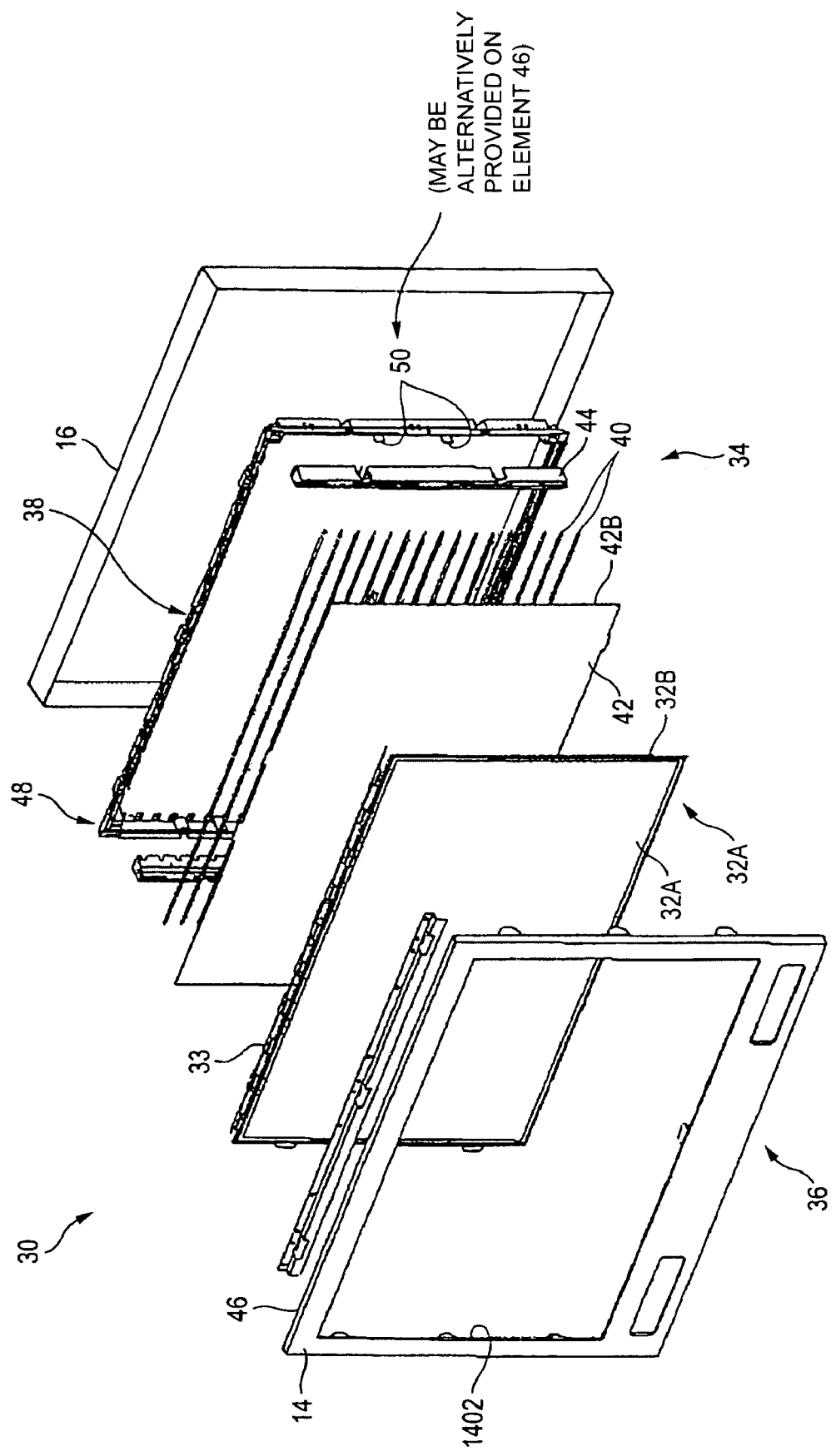
FIG. 3 is an exploded perspective view of a liquid crystal display device 30.
Figure 4:
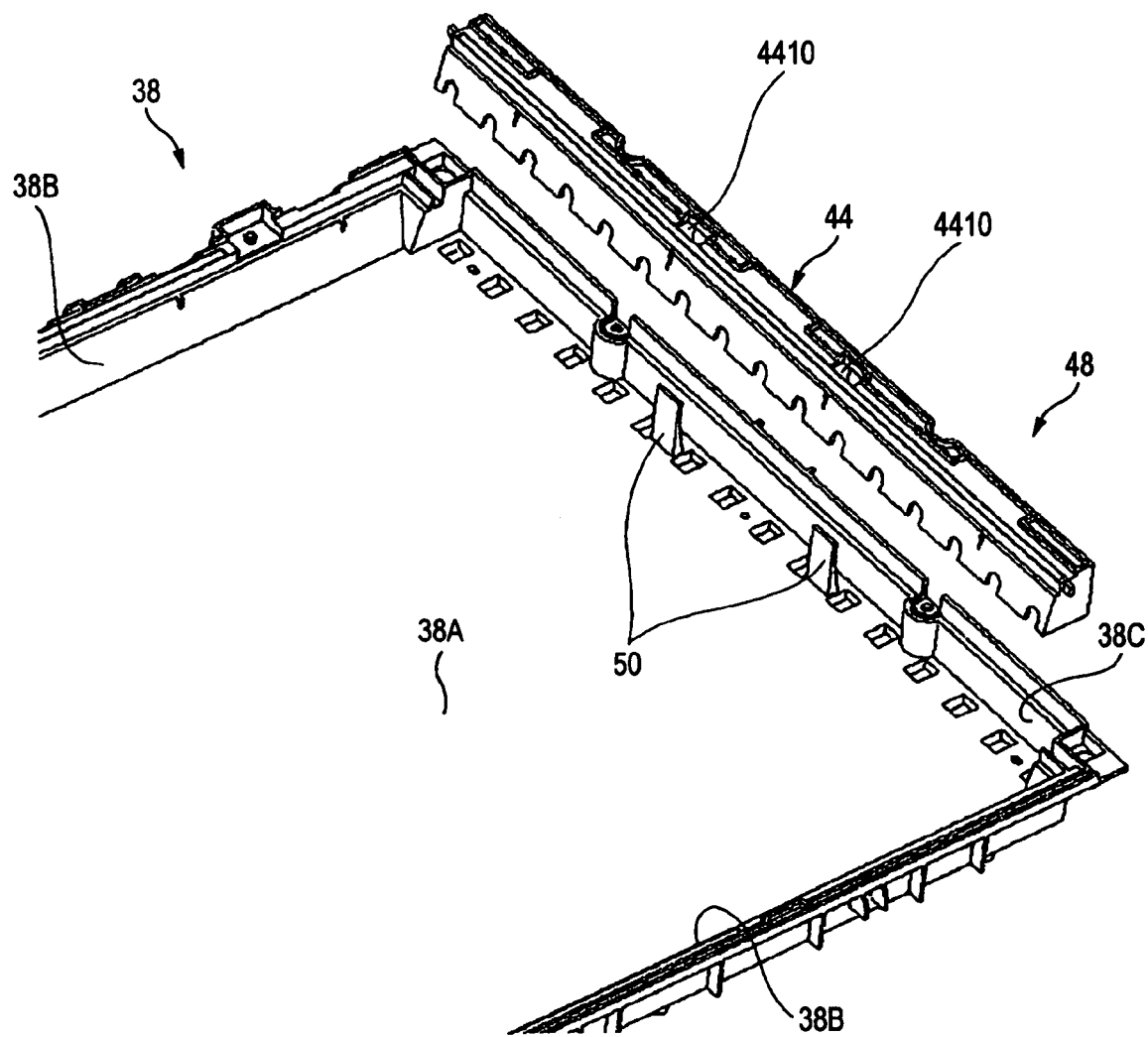
FIG. 4 is an exploded perspective view of a reflection plate 38.
Figure 5:
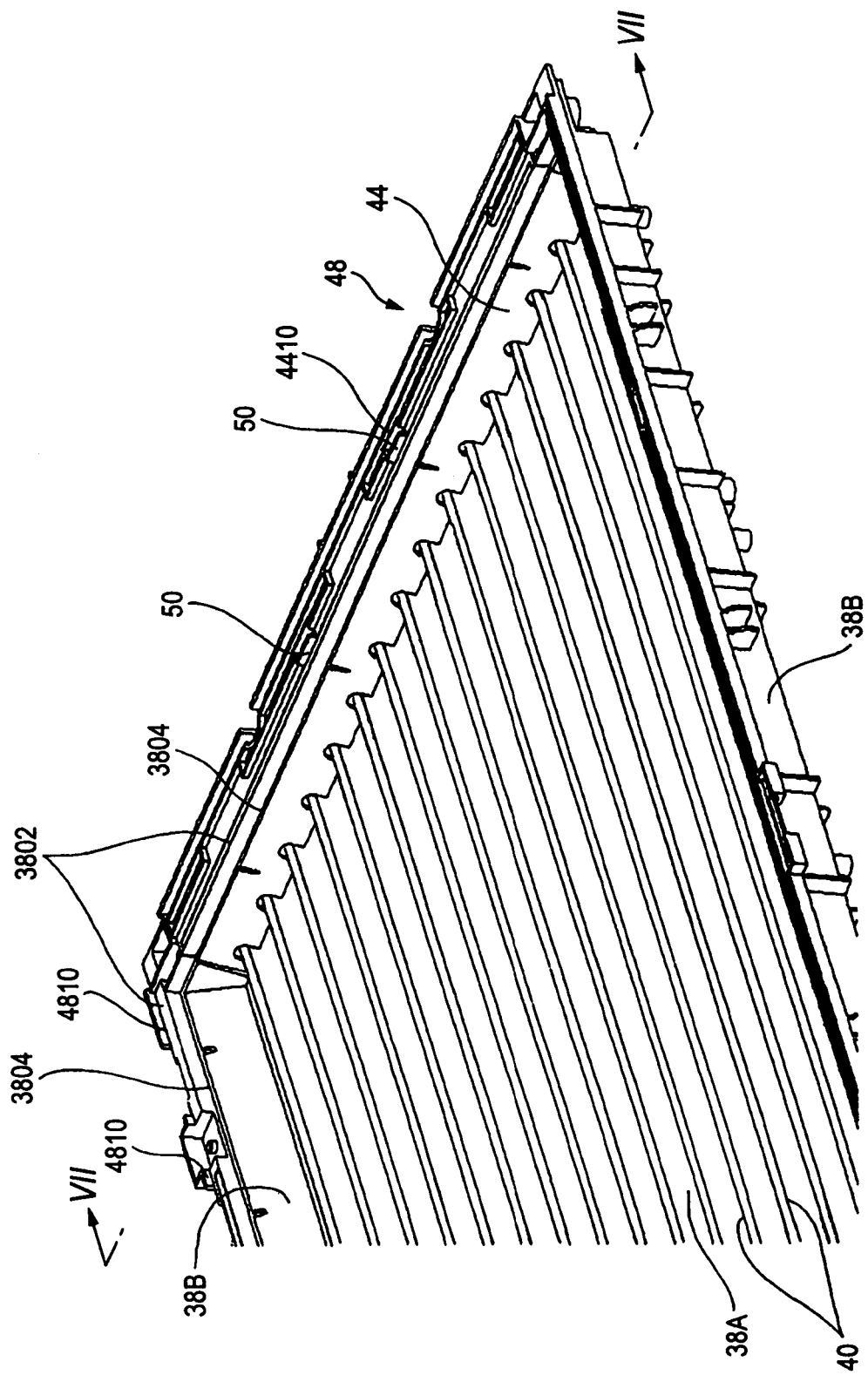
FIG. 5 is a perspective view of the reflection plate 38 carrying thereon fluorescent tubes 40.
Figure 6:
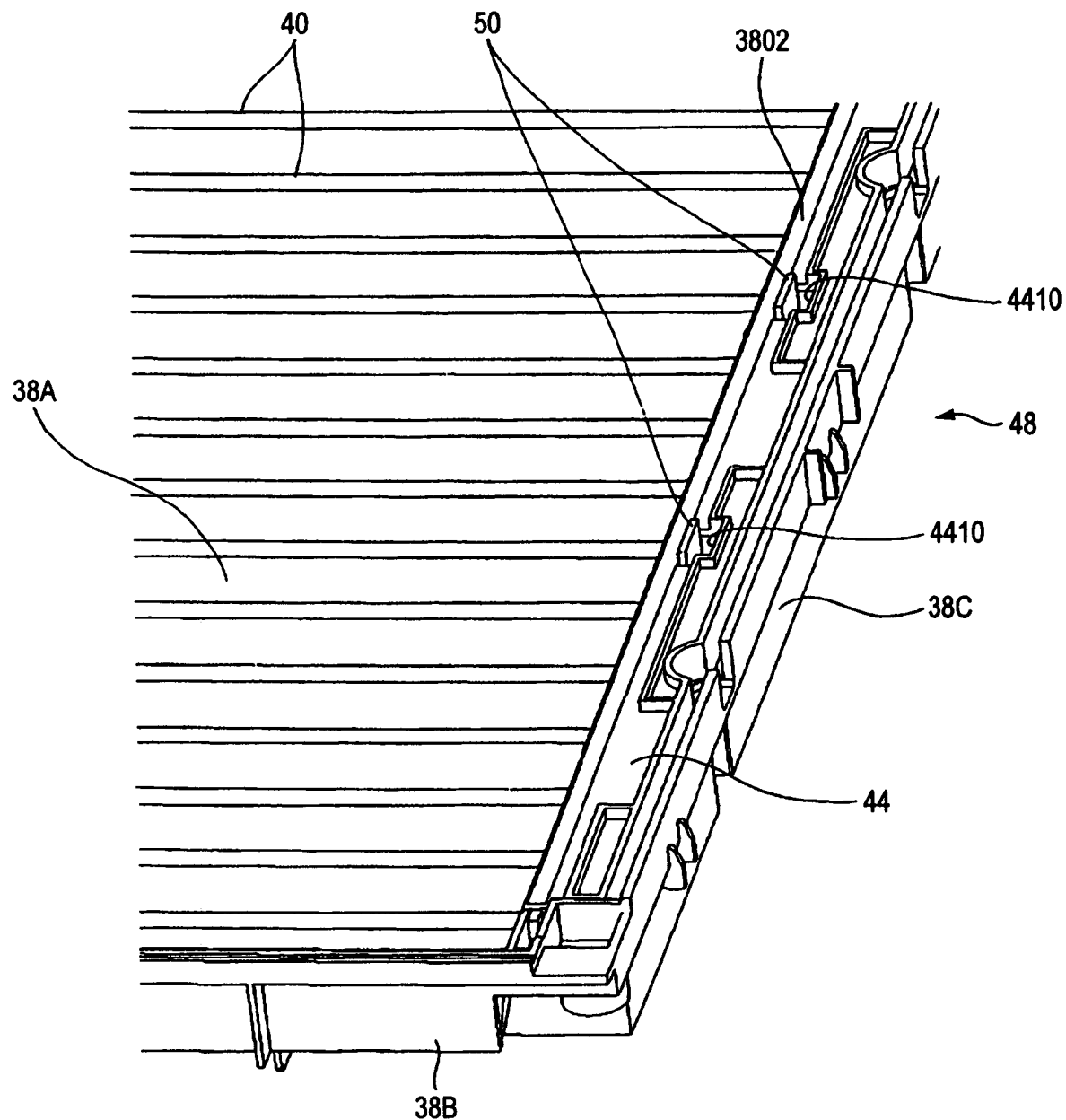
FIG. 6 is another perspective view of the reflection plate 38 carrying thereon the fluorescent tubes 40.
Figure 7:
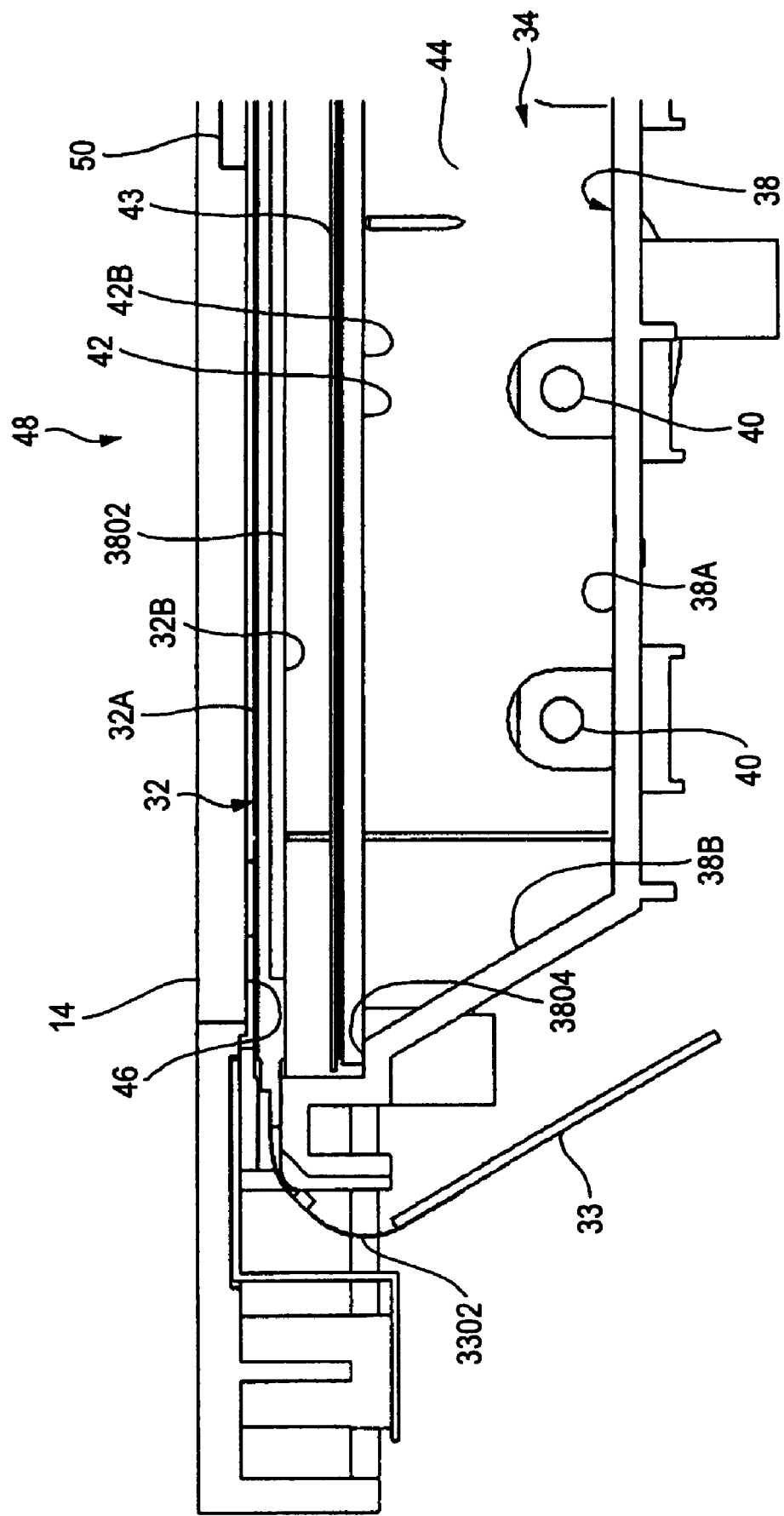
FIG. 7 is a cross sectional view of the reflection plate 38 cut along a line AA of FIG. 5.
Figure 8:
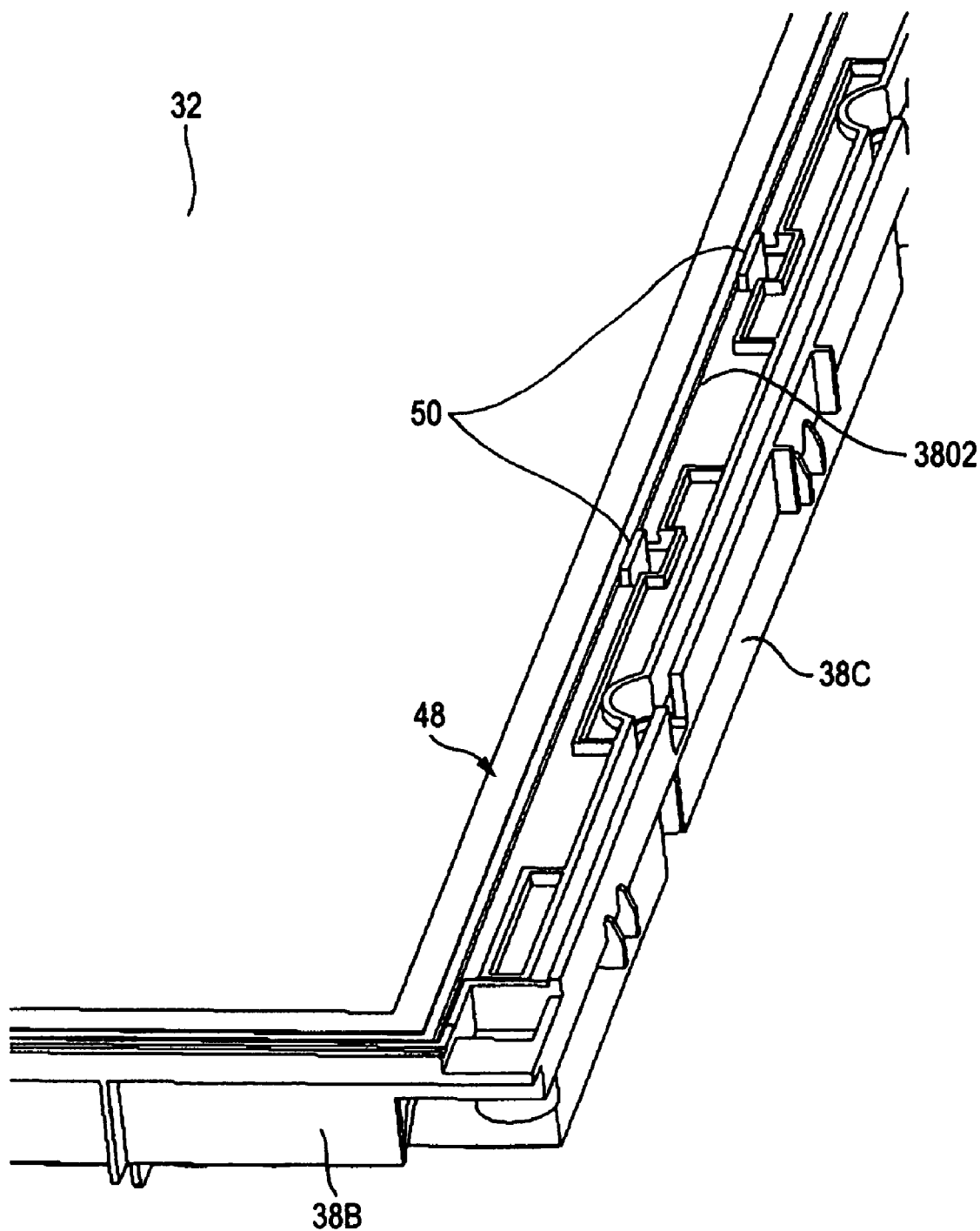
FIG. 8 is a perspective view of a liquid crystal panel 32 disposed on a rear wall 48.
Figure 9:
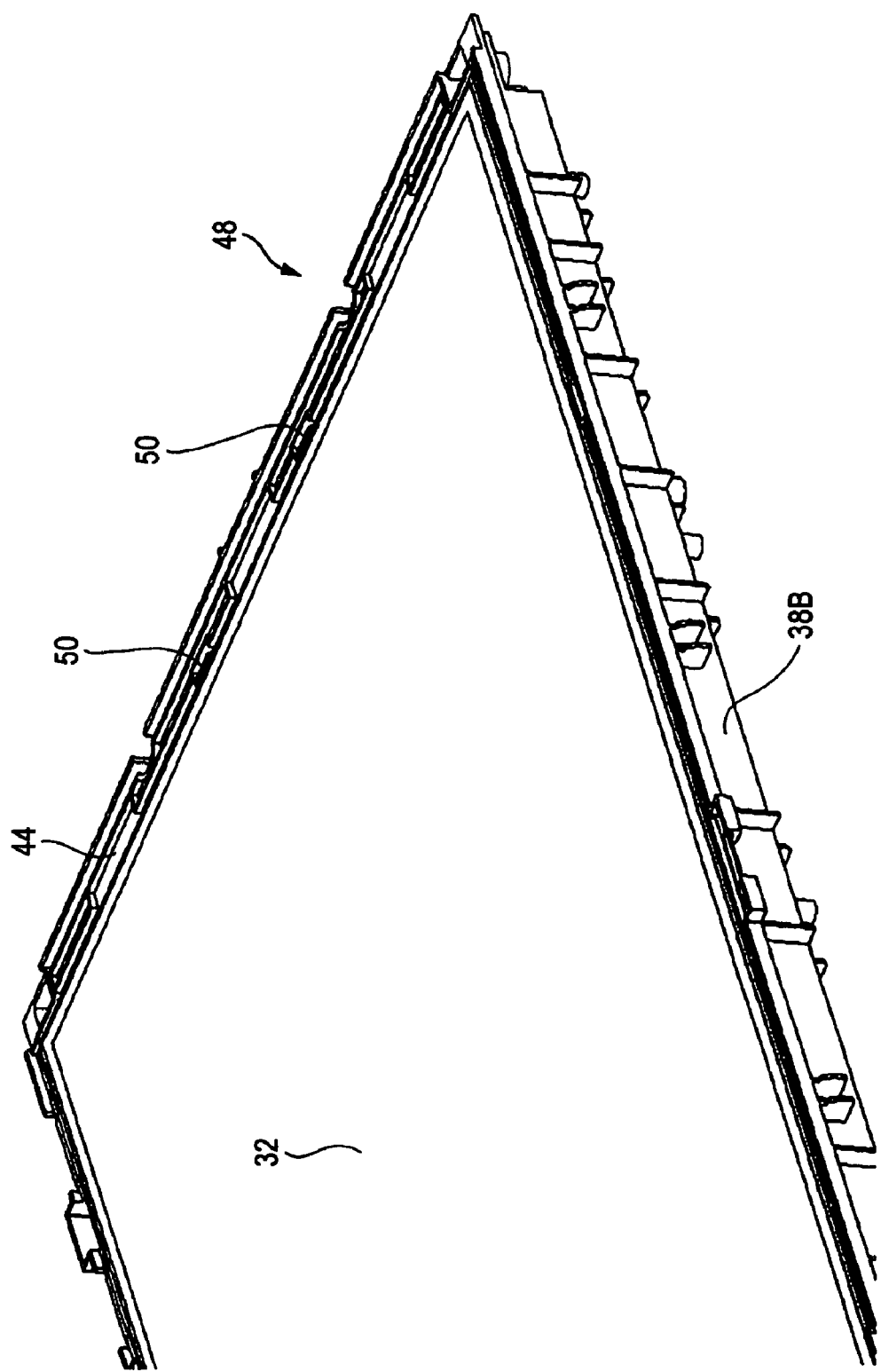
FIG. 9 is another perspective view of the liquid crystal panel 32 disposed on the rear wall 48.

FIG. 3 is an exploded perspective view of the liquid crystal display device 30, FIG. 4 is an exploded perspective view of a reflection plate 38, FIGS. 5 and 6 are each a perspective view of the reflection plate 38 carrying thereon fluorescent tubes 40, FIG. 7 is a cross sectional view of the reflection plate 38 cut along a line AA of FIG. 5, and FIGS. 8 and 9 are each a perspective view of the liquid crystal panel 32 disposed on a rear wall 48.

As shown in FIG. 1, the chassis 12 of the television unit 10 is formed flat in the shape of rectangular, including a front panel 14 configuring the outer surface and a rear panel 16. As shown in FIG. 3, the liquid crystal display device 30 is configured to include the liquid crystal panel 32, a backlight unit 34, a case 36, and others.

In this embodiment, a part of the chassis 12 of the television unit 10 serves as a part of the case 36 of the liquid crystal display device 30. More in detail, the front panel 14 of the television unit 10 serves also as the front panel 14 of the liquid crystal display device 30 configuring the front surface of the liquid crystal display device 30, and configures a part of the case 36 of the liquid crystal display device 30.

Inside of the front surface of the front panel 14, a rectangular-shaped aperture 1402 is formed, and inside of the chassis 12, the liquid crystal display device 30 of the embodiment of the invention is incorporated. As shown in FIG. 1, right and left speakers 18 are respectively provided to the front surface of the front panel 14 at lower both ends.

The liquid crystal display device 30 of the embodiment is configured to include the case 36, the liquid crystal panel 32, the rear wall 48, a front wall 46, and a positioning piece 50.

In this embodiment, as shown in FIG. 3, the front wall 46 is configured by the rear surface of the front panel 14.

The front wall 46 is in the square-frame shape, and pinches the liquid crystal panel 32 with the rear wall 48 by coming in contact with the rim of the display surface of the liquid crystal panel 32.

The liquid crystal panel 32 is also in the square-frame shape, and is incorporated inside of the case 36. The liquid crystal panel 32 is configured to include a display surface 32A for image display, and a rear surface 32B located opposite to the display surface 32A.

In this embodiment, the liquid crystal panel 32 is flat in the shape of rectangular, and is configured to include a pair of short sides and a pair of long sides. The short sides are opposing each other in the lateral direction, and the long sides are opposing each other in the longitudinal direction.

The liquid crystal panel 32 is configured to include two transparent glass substrates, a liquid crystal layer sandwiched between the glass substrates, a transparent electrode provided to the inner surface of each of the glass substrates, a color filter, a polarization plate, and others.

More in detail, in the liquid crystal panel 32, two transparent substrates made of glass or others are disposed opposing each other, and to a space therebetween, a liquid crystal layer filled with a liquid crystal material is provided.

One of the substrates is formed with signal and scan lines in matrix, switching elements (thin film transistors) each disposed at an intersection of the signal and scan lines, pixel electrodes, and others. The switching elements are sequentially selected by the scan lines, and serve to write video signals coming from the signal lines to any corresponding pixel electrodes.

The other substrate is formed with an opposing electrode and a color filter.

The color filter is partitioned into a plurality of segments corresponding to pixels, e.g., partitioned into three filter segments of primary colors of red, green, and blue.

These two substrates are sandwiched by two polarization plates.

Note here that any various previously-known configurations are applicable to the liquid crystal panel 32.

In the state that the liquid crystal panel 32 is exposed, from the rear (from the rear surface), to illumination lights coming from the backlight unit 34, a drive signal for image display is provided to the scan and signal lines and the opposing electrode, and the liquid crystal material of the liquid crystal layer is driven so that image display is performed.

Note that, in FIGS. 3 and 7, a reference numeral 33 denotes a drive substrate configuring a drive circuit for driving the liquid crystal panel 32. The drive substrate 33 is connected to the upper edge of the liquid crystal panel 32 via a flexible substrate 3302.

As shown in FIGS. 3 and 7, the backlight unit 34 is disposed inside of the case 36 and behind the rear of the liquid crystal panel 32.

The backlight unit 34 is configured to include the reflection plate 38, a plurality of fluorescent tubes 40, and a diffusion plate 42.

The reflection plate 38 is disposed at the rear of the fluorescent tubes 40, and serves to reflect lights coming from the fluorescent tubes 40 to the diffusion plate 42. The reflection plate 38 is made of a white synthetic resin material with a high reflection coefficient. The synthetic resin material includes various previously-known materials such as polycarbonate (PC) resin.

As shown in FIG. 4, the reflection plate 38 is configured to include a rectangular-shaped flat plate portion 38A, two long-side walls 38B, two short-side walls 38C, and two side molds 44. The long-side walls 38B are each respectively stood upright from two long sides of the plate portion 38A, and the short-side walls 38C are respectively stood upright from the two short sides of the plate portion 38A. The two side molds 44 are attached to the plate portion 38A inside of the two short side walls 38C, and are respectively disposed along the short sides (more in detail, the inner surfaces of the side molds 44 where the side molds 44 are facing the plate portion 38A).

In this embodiment, as shown in FIGS. 3 and 7, the reflection plate 38 is a member located at the far rear in the case 36 of the liquid crystal display device 30. AS such, in this embodiment, the reflection plate 38 corresponds to a rear panel configuring the rear surface of the liquid crystal display device 30.

As shown in FIG. 6, the rear wall 48 is formed like a rectangular frame by the two long-side walls 38B and the two side molds 44.

As shown in FIGS. 5 and 7, the rear wall 48 is provided with a first abutment plane 3802 and a second abutment plane 3804 both being directed frontward.

The first abutment plane 3802 is disposed across the two long-side walls 38B and the two side molds 44. The first abutment plane 3802 is square-frame shaped, and is configured to come in contact with the rim portion of the rear surface 32B of the liquid crystal panel 32 by extending along the four sides of the liquid crystal panel 32 on the same plane.

The second abutment plane 3804 is also disposed across the two long-side walls 38B and the two side molds 44. The second abutment plane 3804 is square-frame shaped inside of the first abutment plane 3802, and is configured to come in contact with the rim portion of a rear surface 42B of the diffusion plate 42 by extending along the four sides of the diffusion plate 42 with a displacement toward the rear than the first abutment plane 3802.

The fluorescent tubes 40 are each configured by a cold cathode tube (fluorescent lamp), which emits white lights with a supply of current. In this embodiment, as shown in FIG. 7, the fluorescent tubes 40 are disposed between the reflection plate 38 and the diffusion plate 42 in the lateral direction with a space in the vertical direction.

Note here that, as shown in FIG. 5, the right and left ends of the fluorescent tubes 40 are hidden inside of the side molds 44. This configuration is aimed not to shadow the right and left ends of the display surface 32A of the liquid crystal panel 32.

More in detail, the fluorescent tubes 40 are each formed with electrodes respectively at both sides, and the inner wall thereof is coated with any predetermined fluorescent material. The fluorescent tubes 40 are each filled with a noble gas such as Hg (mercury) and Xe (xenon).

With a current flow to the electrodes, thermionic emission from filaments occurs into the fluorescent tubes 40 so that discharge is started. In response, the thermionic excitation is caused through collision with Hg atoms in the tubes so that ultraviolet rays are emitted. With emission of the ultraviolet rays as such, the Hg atoms are put in the ground state. The ultraviolet rays are then absorbed by the fluorescent material coated to the walls of the fluorescent tubes so that the white lights are emitted to the outside.

In this embodiment, the fluorescent tubes 40 are each attached, at both ends in the longitudinal direction, to the reflection plate 38 via a holder that is not shown. Note here that any various previously-known placement configurations are applicable to the fluorescent tubes 40.

As shown in FIGS. 3 and 7, the diffusion plate 42 is disposed in the front of the fluorescent tubes 40.

The diffusion plate 42 serves to illuminate the liquid crystal panel 32 from the rear by diffusing both the lights coming from the fluorescent tubes 40 and the lights reflected against the diffusion plate 42 by the reflection plate 38. The diffusion plate 42 is made of a translucent material.

The translucent material for use to configure such a diffusion plate 42 includes, possibly, a polystyrene resin or MS resin (styrene methyl methacrylate resin), for example.

In this embodiment, as shown in FIG. 7, the surface of the diffusion plate 42 facing the liquid crystal panel 32 is provided with an optical sheet 43 for use to guide the lights coming from the diffusion plate 42 to the liquid crystal panel 32. This is surely not restrictive, and various previously-known configurations are applicable to the diffusion plate 42.

The diffusion plate 42 is shaped flat in the shape of rectangular, and is disposed by the rim portion of the rear surface 42B thereof being abutted against the rear wall 48.

The positioning pieces 50 are used to position the liquid crystal panel 32 with respect to the case 36 by being abutted against the side portions of the liquid crystal panel 32 that are opposing to each other.

As shown in FIGS. 4 to 9, the positioning pieces 50 are each protruded from the plate portion 38A as a piece therewith, and serves to position the liquid crystal panel 32 in the lateral direction with respect to the rear wall 48 by abutting against the short sides on both sides (side portions) of the liquid crystal panel 32. The plate portion 38A is a portion close to the short-side walls 38C of the rear walls 48 that are opposing each other.

As shown in FIG. 4, the positioning piece 50 is with the lateral width smaller than the vertical height, has a cross section being long in the vertical direction, and is protruded toward the front of the rear wall 48. As such, the positioning piece 50 is extended in the fore and aft direction, and is shaped elastically deformable along the plane direction of the liquid crystal plane 32, in other words, is shaped elastically deformable in the lateral direction of the liquid crystal panel 32.

In this embodiment, the positioning piece 50 is disposed plurally in such a manner as to come in contact with a plurality portions of the short sides of the liquid crystal panel 32.

More in detail, as shown in FIGS. 4, 5, and 6, the front surfaces of the side molds 44 are each formed with a plurality of apertures 4410 to allow elastic deformation of the positioning pieces 50 in the lateral direction. The apertures 4410 are each formed larger in outline than the positioning piece 50. Through such apertures 4410, the positioning pieces 50 are each protruded toward the front of the front surfaces of the side molds 44, and as shown in FIGS. 8 and 9, are each so provided as to come in contact with the short sides of the liquid crystal panel 32, which come in contact with the first abutment plane 3802 of each of the side molds 44 with the elasticity remained.

As shown in FIG. 5, in this embodiment, an abutment section 4810 is provided to the lower portion of the rear wall 48 for positioning of the liquid crystal panel 32 in the vertical direction with respect to the case 36, i.e., the abutment section 4810 abuts one of the long sides of the liquid crystal panel 32 located lower than the other (side portion).

The abutment section 4810 is plurally provided at regular intervals in the longitudinal direction of the long side located lower than the other.

Described next is the assembly of the liquid crystal display device 30.

First of all, the reflection plate 38 is placed flat, and the fluorescent tubes 40 and the side molds 44 are attached thereto.

Thereafter, on the second abutment plane 3804 of the rear wall 48 of the reflection plate 38, the rim portion of the rear surface 42B of the diffusion plate 42 is placed for attachment.

Note here that various previously-known attachment configurations are applicable to the diffusion plate 42, e.g., four sides of the diffusion plate 42 are abutted against the rear wall 48 for attachment using holders, lug pieces, or others formed to the case 36.

Next, above the reflection plate 38, the short sides of the liquid crystal panel 32 in the lateral direction are positioned between the positioning pieces 50. One of the long sides of the liquid crystal panel 32 that is supposed to be located lower than the other when the liquid crystal display device 30 is stood upright is then faced to the abutment sections 4810, and the rim portion of the rear surface 32B of the liquid crystal panel 32 is made to face above the first abutment plane 3802 of the rear wall 48. In the state, the liquid crystal panel 32 is moved downward so that the rim portion of the rear surface 32B of the liquid crystal panel 32 is placed on the first abutment plane 3802 of the rear wall 48.

As such, with the lateral short sides of the liquid crystal panel 32 abutted against the positioning pieces 50 with elasticity remained, the liquid crystal panel 32 is positioned with respect to the reflection plate 38 (case 36) in the lateral direction.

Thereafter, the front panel 14 (front wall 46) is placed above the display surface 32A of the liquid crystal panel 32 so that the front panel 14 covers the rim of the display surface 32A. As such, the front wall 46 of the front panel 14 is placed on the rim of the display surface 32A.

In this state, the components, i.e., the reflection plate 38, the diffusion plate 42, the liquid crystal panel 32, and the front panel 14, are stood upright, i.e., directed in the vertical direction.

As a result, the liquid crystal panel 32 is moved downward between the diffusion plate 42 and the front panel 14 due to its weight, and the lower end of the liquid crystal panel 32 is abutted against above the abutment sections 4810. In this manner, the liquid crystal panel 32 is positioned in the vertical direction with respect to the reflection plate 38 (case 36).

After positioning as such, the front panel 14 and the reflection panel 38 are then coupled together using a screw(s) that are not shown. With such coupling, the liquid crystal panel 32 is sandwiched between the front wall 46 and the rear wall 48, thereby being fixed not to move in both the vertical and lateral directions.

This is the end of the assembly of the liquid crystal display device 30.

According to the embodiment, the positioning pieces 50 formed elastically deformable along the plane direction of the liquid crystal plane 32 are abutted against the side portions of the liquid crystal panel 32 that are opposing each other so that the liquid crystal panel 32 is positioned with respect to the case 36. As such, positioning of the liquid crystal panel 32 can be performed without fail along the display surface 32A.

What is better, even if the case 36 shrinks more compared with the liquid crystal panel 32 as a result of the decrease of the environmental temperature, with the positioning pieces 50 abutted against the side portions of the liquid crystal panel 32 being elastically deformed, the force acting on the side portions of the liquid crystal panel 32 can be reduced, thereby being able to prevent without fail any problem of disturbing the display screen of the liquid crystal panel 32.

As such, irrespective of any possible change of the environmental temperature, positioning of the liquid crystal panel along the display surface thereof can be performed while display images are of satisfactory quality so that the resulting liquid crystal display device 30 can be advantageous in terms of size increase.

Moreover, in the embodiment, the positioning pieces 50 are formed as a piece with the rear wall 48 so that, advantageously, the number of components can be reduced, and the cost of the liquid crystal display device 30 can be reduced.

Also in this embodiment, the positioning pieces 50 are provided to both ends of the long sides of the liquid crystal panel 32, which is large in size with a high shrinkage. This works advantageous in terms of positioning of the liquid crystal panel 32 with more accuracy with respect to the case 36 while display images are of satisfactory quality irrespective of any possible change of the environmental temperature.

Note that, in this embodiment, the positioning pieces 50 are so disposed as to come in contact with the lateral side portions of the liquid crystal panel 32 that are opposing each other. Alternatively, the positioning pieces 50 may be so disposed as to come in contact with the vertical side portions of the liquid crystal panel 32.

Also in this embodiment, described is the case of providing the positioning pieces 50 to the rear wall 48. This is surely not restrictive, and the positioning pieces 50 may be provided to the front wall 46.

Also in this embodiment, described is the case that the liquid crystal display device 30 is applied to the television unit 10. This is not restrictive, and the embodiment of the invention is surely applicable not only to monitor units such as desktop computers, notebook personal computers, imaging apparatuses such as video cameras and digital still cameras equipped with liquid crystal display devices, PDAs (Personal Digital Assistants), and mobile phones but also to various types of electronic equipment equipped with liquid crystal display devices.

It should be understood by those skilled in the art that various modifications, combinations, sub-combinations and alterations may occur depending on design requirements and other factors insofar as they are within the scope of the appended claims or the equivalents thereof.

The invention claimed is:

1. A liquid crystal display device, comprising:
a case; and
a liquid crystal panel incorporated inside of the case, wherein
the case includes
a rear wall abutting a rim portion of a rear surface located on a side opposite to a display surface of the liquid crystal panel, and
a front wall abutting a rim portion of the display surface of the liquid crystal panel, and sandwiching the liquid crystal panel with the rear wall,
a pair of positioning pieces are provided to either the rear wall or the front wall for positioning of the liquid crystal panel with respect to the case by respectively coming in contact with side portions of the liquid crystal panel that are opposing each other, and
the positioning pieces are each formed to be elastically deformable along a plane direction of the liquid crystal panel such that if an environmental temperature change causes the case to deform relative to the liquid crystal panel the positioning pieces deform to compensate for the relative deformation between the case and panel.

2. The liquid crystal display device according to claim 1, wherein
the positioning pieces are respectively protruding from portions of the rear wall that are opposing each other.

3. The liquid crystal display device according to claim 1, wherein
the rear wall is made of synthetic resin, and the positioning pieces are respectively formed protruding from portions of the rear wall that are opposing each other to be a piece with the rear wall.

4. The liquid crystal display device according to claim 1, wherein the liquid crystal panel is flat in a shape of rectangular, and includes a pair of short sides that are opposing each other, and the positioning pieces are respectively disposed to abut the pair of short sides.

5. The liquid crystal display device according to claim 1, wherein the liquid crystal panel is flat in a shape of rectangular, and includes a pair of short sides that are opposing each other, and the positioning pieces are respectively disposed to abut a plurality of portions on the pair of short sides.

6. The liquid crystal display device according to claim 1, wherein the liquid crystal panel is flat in a shape of rectangular, and includes a pair of short sides that are opposing each other in a lateral direction and a pair of long sides that are opposing each other in a longitudinal direction, the positioning pieces are disposed to abut the pair of short sides for positioning of the liquid crystal panel in the lateral direction with respect to the case, and an abutment section is provided to a lower portion of the rear wall or to a lower portion of the front wall for positioning of the liquid crystal panel in the longitudinal direction with respect to the case by abutting one of the pair of the long sides located lower than the other.

7. The liquid crystal display device according to claim 1, wherein the case includes a front panel configuring a front surface of the liquid crystal display device, and the front wall is disposed to a rear surface of the front panel.

8. The liquid crystal display device according to claim 1, wherein the case includes a rear panel configuring a rear surface of the liquid crystal display device, and the rear wall is disposed to a front surface of the rear panel.

9. The liquid crystal display device according to claim 1, further comprising a pair of side molds provided to either the rear wall or the front wall of the case, the side molds including a plurality of apertures, and the positioning pieces protruding through the apertures such that the positioning pieces may deform in a lateral direction.

* * * * *